(12) United States Patent
Kreutzer et al.

(10) Patent No.: US 10,641,370 B2
(45) Date of Patent: May 5, 2020

(54) BALL SCREW

(71) Applicant: Schaeffler Technologies AG & Co. KG, Herzogenaurach (DE)

(72) Inventors: Mario Kreutzer, Sonneberg (DE); Richard Baier, Aurachtal (DE); Markus Oswald, Erlangen (DE); Dieter Adler, Herzogenaurach (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 413 days.

(21) Appl. No.: 15/513,016

(22) PCT Filed: Sep. 3, 2015

(86) PCT No.: PCT/DE2015/200449
§ 371 (c)(1),
(2) Date: Mar. 21, 2017

(87) PCT Pub. No.: WO2016/045673
PCT Pub. Date: Mar. 31, 2016

(65) Prior Publication Data
US 2017/0299028 A1    Oct. 19, 2017

(30) Foreign Application Priority Data
Sep. 24, 2014   (DE) .................. 10 2014 219 256

(51) Int. Cl.
*F16H 25/24* (2006.01)
*F16H 25/20* (2006.01)
*F16H 25/22* (2006.01)
*F16D 65/18* (2006.01)
*B60T 13/74* (2006.01)
(Continued)

(52) U.S. Cl.
CPC ........ *F16H 25/2454* (2013.01); *B60T 13/746* (2013.01); *F16D 65/18* (2013.01); *F16H 25/2015* (2013.01); *F16H 25/2223* (2013.01); *F16D 2121/24* (2013.01);
(Continued)

(58) Field of Classification Search
CPC .................................................. F16H 25/2454
See application file for complete search history.

(56) References Cited

U.S. PATENT DOCUMENTS 2,875,630 A * 3/1959 Douglas ............... F16H 25/2204
74/89.39
3,499,344 A * 3/1970 Pickles ................ B60N 2/0224
475/149
(Continued)

FOREIGN PATENT DOCUMENTS

CN    101014784    8/2007
CN    102906457    1/2013
(Continued)

*Primary Examiner* — Howard J Sanders
*Assistant Examiner* — Gregory T Prather
(74) *Attorney, Agent, or Firm* — Volpe and Koenig, P.C.

(57) ABSTRACT

The invention relates to a ball screw including a spindle nut arranged on a lead screw, and balls, which roll on ball grooves of the spindle nut and of the lead screw, and a circumferential stop on the screw side and a circumferential stop on the nut side, the spindle nut being arranged in a sleeve surrounding the ball nut, the sleeve is formed from sheet metal by shaping and the nut-side circumferential stop is formed integrally on the sleeve.

9 Claims, 5 Drawing Sheets

(51) Int. Cl.
*F16D 125/40* (2012.01)
*F16D 125/36* (2012.01)
*F16D 121/24* (2012.01)

(52) U.S. Cl.
CPC ...... *F16D 2125/36* (2013.01); *F16D 2125/40* (2013.01); *F16H 2025/204* (2013.01); *F16H 2025/2481* (2013.01)

(56) References Cited

U.S. PATENT DOCUMENTS

| | | | |
|---|---|---|---|
| 4,782,715 A * | 11/1988 | Chevance | B60N 2/164 74/89.39 |
| 4,799,734 A * | 1/1989 | Periou | F16B 1/00 297/362.14 |
| 5,582,072 A * | 12/1996 | Yamaguchi | F16H 25/2209 74/424.72 |
| 5,653,290 A * | 8/1997 | Bland | E21B 19/07 166/381 |
| 6,405,836 B1 | 6/2002 | Rieth et al. | |
| 6,494,033 B1 * | 12/2002 | Davies | F02K 1/76 188/162 |
| 6,763,918 B1 * | 7/2004 | Kapaan | F16H 25/2204 188/106 A |
| 9,737,926 B2 | 8/2017 | Harada et al. | |
| 2001/0029797 A1 | 10/2001 | Lange et al. | |
| 2006/0037419 A1 * | 2/2006 | Osterlanger | F16H 25/24 74/89 |
| 2012/0090418 A1 | 4/2012 | Barthlein et al. | |
| 2014/0290409 A1 * | 10/2014 | Rehfus | F16H 25/2204 74/424.81 |
| 2015/0283600 A1 * | 10/2015 | Harada | B21J 5/12 72/352 |
| 2017/0028805 A1 * | 2/2017 | Krehmer | B60G 11/16 |
| 2018/0017147 A1 * | 1/2018 | Kreutzer | F16H 25/2233 |
| 2018/0209521 A1 * | 7/2018 | Kreutzer | F16H 25/2219 |
| 2019/0072162 A1 * | 3/2019 | Oswald | F16H 25/2015 |
| 2019/0170230 A1 * | 6/2019 | Ott | F16H 25/2204 |

FOREIGN PATENT DOCUMENTS

| | | |
|---|---|---|
| DE | 10219840 | 11/2003 |
| DE | 102008062180 | 9/2009 |
| DE | 102008025349 | 12/2009 |
| DE | 102012215395 | 3/2014 |
| EP | 1058795 | 9/2003 |
| EP | 2077407 | 7/2009 |
| EP | 2210767 | 7/2010 |
| JP | 2010236599 | 10/2010 |
| JP | 2012127385 | 7/2012 |
| WO | 2011018306 | 2/2011 |

* cited by examiner

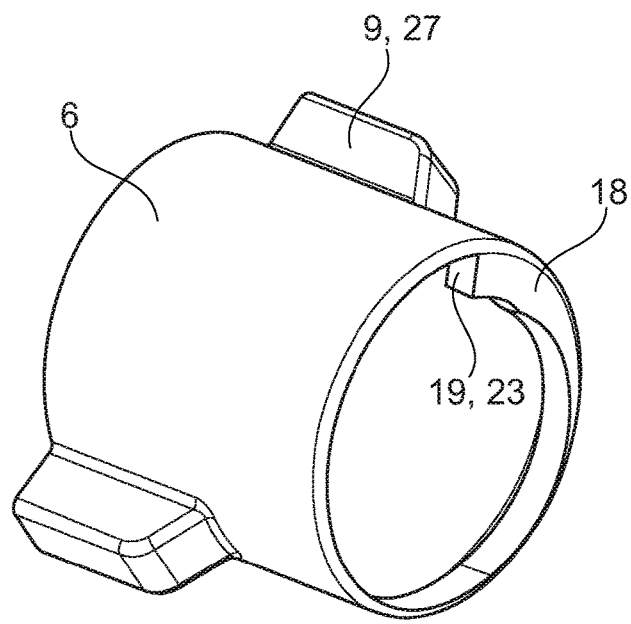
Fig. 9
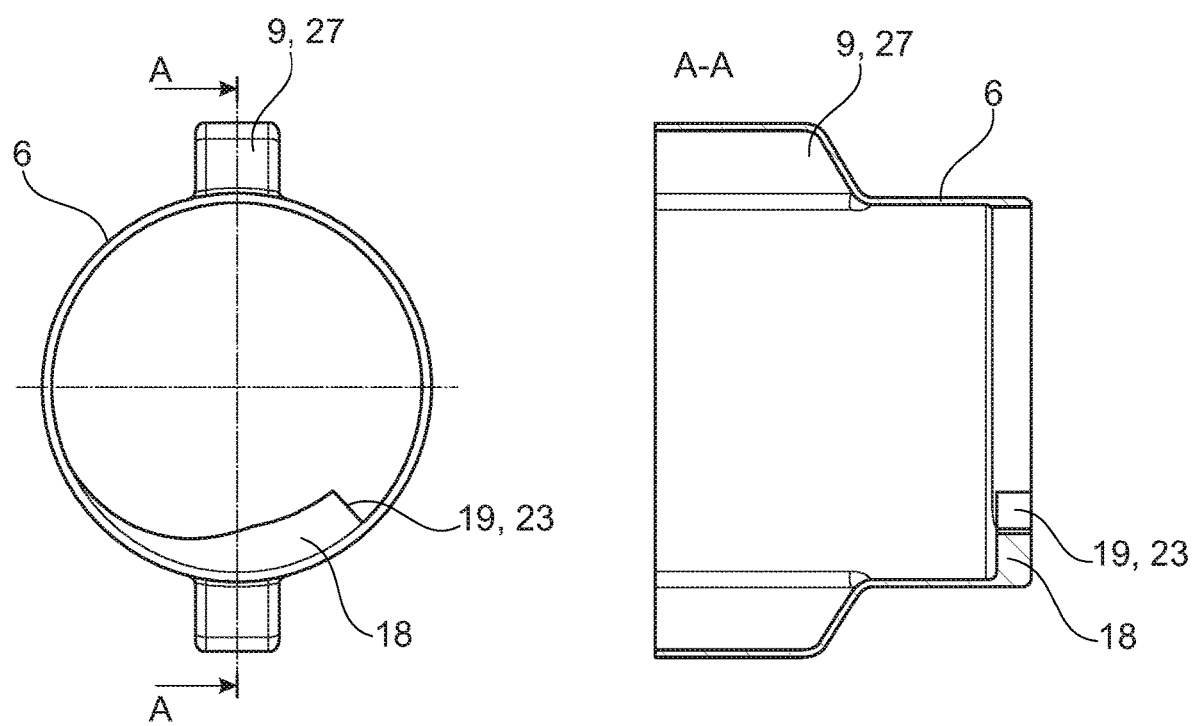
Fig. 10
Fig. 11

BALL SCREW

BACKGROUND

The present invention relates to a ball screw. Such drives convert relative rotational movements of threaded spindles and spindle nuts into a translational movement. The present invention further relates to a braking device of a motor vehicle that is provided with such a ball screw.

From DE102008062180, a ball screw according to the features of the preamble has become known. In a spindle nut, a groove is machined on the end side, which is bounded on the circumferential side by a stop surface. When the spindle nut and the threaded spindle are rotated relative to each other, the spindle-side circumferential stop and the nut-side circumferential stop approach each other in one of the two directions of rotation until finally the facing stop surfaces of the two stops contact each other and prevent further relative rotation. Jamming of the spindle nut is thus ruled out. Machining of the groove in the spindle nut takes place in a separate production step. The object of the present invention is to provide a ball screw according to the features of the preamble whose circumferential stop can be produced in an economically favorable way.

SUMMARY

According to the invention, this object is achieved by a ball screw according to the invention. This ball screw is provided with a spindle nut arranged on a threaded spindle and with balls that roll on ball groves of the spindle nut and the threaded spindle. A spindle-side circumferential stop and a nut-side circumferential stop are also provided. The spindle nut is mounted in a sleeve that surrounds the spindle nut and on which the nut-side circumferential stop is formed integrally. A separate machining of a groove in an end surface of the spindle nut is eliminated. The sleeve can be produced in an economically favorable way from sheet metal in a shaping method, in particular, by deep drawing with the integrally formed circumferential stop. The sheet metal can be bent in order to assume the shape of the sleeve.

The sleeve and the spindle nut can be locked in rotation with each other in one of several possible selected rotational positions. The spindle nut can have a cylindrical lateral surface, which can be advantageous from production-related reasons and in terms of assembly; this spindle nut can be made from a tubular component in an economically favorable way. A special rotational position does not have to be maintained between the spindle nut and sleeve as such.

In the known circumferential stops, it is complicated to position the two circumferential stops so that jamming is prevented. This jamming between the spindle nut and stop part is realized when the end surfaces of the spindle nut and stop part contact each other before the circumferential stops are active. In the known circumferential stops, this problem can be solved in that the stop part is connected to the threaded spindle rigidly only when the alignment of the two circumferential stops is adjusted so that they contact each other before undesired jamming takes place.

In contrast, in the invention it is not important in which rotational position the spindle-side circumferential stop and the spindle nut mounted on the threaded spindle are arranged relative to each other. The sleeve is locked to the spindle nut only when the alignment of the circumferential stop formed on the sleeve and the spindle-side circumferential stop is adjusted relative to each other without a problem. This possibility of rotationally locked connection in several different rotational positions with reference to the spindle nut considerably simplifies the assembly. The spindle-side circumferential stop can be formed fixed with the threaded spindle.

The sleeve can be connected by a friction-fit connection and/or by a positive-locking connection for transmitting torque to the spindle nut. The sleeve can be pressed on. Alternatively or additionally, for example, grooves can be formed on the spindle nut and projections can be formed on the sleeve, wherein the projections engage in a positive-locking connection in the grooves in order to transmit torque between the spindle nut and the sleeve.

Through the possibility of mounting in different rotational positions, in a simple way, the rotational position can be selected in which it is guaranteed that the nut-side circumferential stop and the spindle-side circumferential stop contact each other before the end surfaces of the spindle nut and the spindle-side circumferential stop contact each other and due to the helical-shaped movement, an undesired jamming effect between the spindle nut and threaded spindle is created.

The sleeve can have a radial flange with a recess for passing through the spindle-side circumferential stop. This refinement of the invention enables, if necessary, the introduction of the spindle-side circumferential stop into the sleeve in a defined alignment position in which the recess of the sleeve and the spindle-side circumferential stop align with each other. The contours of the recess and the radially projecting spindle-side circumferential stop can be adapted to each other in order to define a certain rotational position in which the sleeve can be pushed, for example, over the spindle-side stop.

This recess and the nut-side circumferential stop can have, in the circumferential direction, a predetermined distance to each other for defining a rotational position of the sleeve and the spindle nut mounted on the threaded spindle in the mentioned alignment position.

In a simple way, this ball screw according to the invention can be assembled according to the following steps: The spindle nut and the threaded spindle are mounted with the balls; the mentioned alignment position of the sleeve and the spindle-side circumferential stop is established or set. In this alignment position, the sleeve is arranged locked in rotation on the spindle nut. If, during operation of the ball screw, the spindle nut with the sleeve and the spindle-side circumferential stop approach each other, the two circumferential stops contact each other before a jamming between the sleeve and the spindle-side circumferential stop can take place. This jamming protection is guaranteed by the circumferential distance from the recess and the nut-side circumferential stop.

For this assembly described according to the invention, for example, the sleeve can be pushed onto the nut and attached there when the nut with the balls was pre-assembled with the threaded spindle. This pre-assembled spindle nut can have any axial distance to the spindle-side circumferential stop. The sleeve guided in a position-oriented way on the threaded spindle is pushed onto the spindle nut in this rotational position and is locked in rotation with the spindle nut.

If the spindle-side circumferential stop is formed on a stop plate that is mounted on the threaded spindle, the stop plate can be mounted in any rotational position on the spindle. The sleeve can be pushed on and oriented in the specified alignment position. Then the spindle nut with the balls can be mounted on the threaded spindle. The sleeve can be pushed onto the spindle nut only through axial displacement along the threaded spindle and locked in rotation with the spindle nut.

If the threaded spindle is driven to rotate, it is necessary to form an anti-twist protection integrally on the sleeve, with which the sleeve locked in rotation with the spindle nut can be supported, for example, on a housing.

The anti-twist protection can be formed by a hollow bump formed on the sleeve and projecting radially from the circumferential surface of the sleeve. The sheet metal of the thin-wall sleeve can also be formed into the bump in a simple way by shaping and bending processes.

Alternatively, it is conceivable that the spindle nut is driven to rotate; in this case, it is necessary that this anti-twist protection is formed on the threaded spindle.

Preferably, the sleeve according to the invention is formed from sheet metal by shaping processes, wherein the circumferential stop and optionally the anti-twist protection can both be formed by shaping processes.

A circumferential stop can be formed on an end-side radial flange of the sleeve, wherein the radial flange is provided with a step formed in the axial direction on which a stop surface of the circumferential stop is formed. If the sleeve has a suitable sheet thickness, the radial flange formed from this sheet metal can be shaped so that the step can be generated.

The radial flange can be arranged in a helical shape around the spindle axis of the threaded spindle, wherein the step is formed by an axial offset of the radial flange. The helical shape of the radial flange can also be generated by simple shaping processes. The step of the radial flange can be produced in an economically favorable way by bending and shaping processes of the thin-wall sheet metal.

The anti-twist protection can be formed by a hollow bump formed on the sleeve and projecting radially from the circumferential surface of the sleeve. The sheet metal of the thin-wall sleeve can also be formed into the bump in a simple way through shaping and bending processes.

In an alternatively formed nut-side stop, the sleeve can have, on its one end side, a radially inward directed, crescent-shaped projection that extends in the circumferential direction from a radially tapered end toward a radially expanded end. On the radially expanded circumferential end, a stop surface of the nut-side stop is formed. In this case, this projection can have, in the axial direction, a wall thickness that is greater than the wall thickness of the sleeve. The wall thickness of the projection determines, in this case, the size of the stop surface. This sleeve can create, in a favorable way, in one shaping and stamping process: first the sleeve is formed with an end-side thick-wall base. Then, in a stamping process, material can be stamped out from this base in order to form the mentioned crescent-shaped projection.

The ball screw can have, in a known way, an endless, screw-shaped ball channel wound about the spindle axis in which the balls can roll between a start and an end of the ball channel on ball grooves of the spindle nut and the threaded spindle. This type of ball screw is provided if only short axial displacement paths between the threaded spindle and spindle nut are provided. In an especially favorable way, such ball screws can be used in combination vehicle brakes in which a hydraulic driving brake is combined with an electromechanical parking brake. In this case, the ball screw according to the invention is part of the drive of the electromechanical parking brake.

Alternatively, a similarly known ball screw can be used in which a start and an end of the ball channel are connected endlessly to each other by a deflection body. The deflection body is then provided with a deflection section in which the balls are deflected. This deflection can be realized by one or more windings. For the so-called individual deflections, a deflection piece is used that is inserted into a recess of the nut, wherein this deflection piece connects the start and end of a common winding of the screw channel. In the so-called outer deflections, for example, an outer deflection piece can be arranged on the outer circumference of the spindle nut and the start and end of multiple windings can be connected to each other.

In the cases in which one of the mentioned deflection bodies is used, the sleeve can surround the deflection bodies and can be held captively on the spindle nut. In this case, the sleeve performs multiple functions: it performs the circumferential stop function for preventing jamming with the threaded spindle; it forms a captive holding device for the deflection body and it can be formed for anti-twist protection of the spindle nut relative to a housing. In the variant of the sleeve according to the invention described by itself without the nut-side circumferential stop, this sleeve also performs multiple functions: it holds the deflection body captively on the spindle nut and it provides anti-twist protection for the spindle nut relative to another component, for example, a housing.

The present invention is suitable, in a particularly favorable way, for use in a braking device, like the one disclosed in DE102008062180. In this respect, the description and drawings of that publication are referenced.

BRIEF DESCRIPTION OF THE DRAWINGS

Below, the invention will be explained in more detail with reference to embodiments shown in a total of 13 figures. Shown are.

DETAILED DESCRIPTION OF THE PREFERRED EMBODIMENTS

Figure 1:
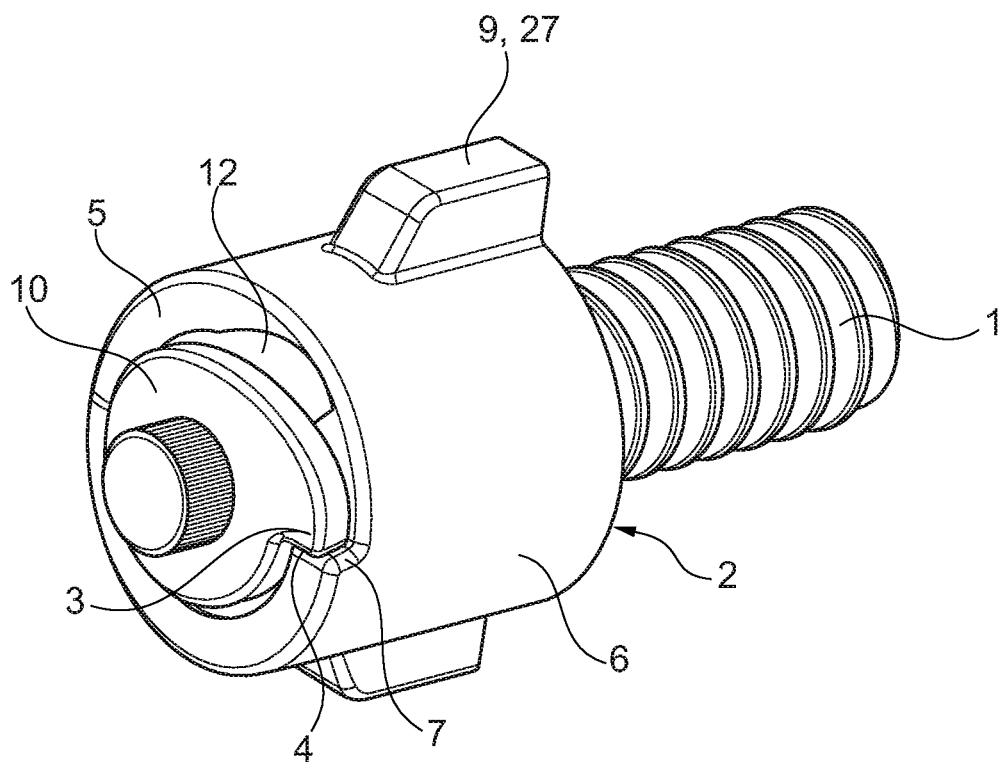
FIGS. 1 and 2 a first embodiment of a ball screw in two different rotational positions, FIGS. 3 to 5 an individual part of the embodiment according to FIG. 1 in different view, FIGS. 6 to 8 a variant of the individual part of a second embodiment in different views, FIGS. 9 to 11 another variant of the individual part of a third embodiment in different views, FIG. 12 a detail of the ball screw according to the invention from FIG. 1, and FIG. 13 a detail of only the spindle nut of the ball screw from FIG. 12.
Figure 2:
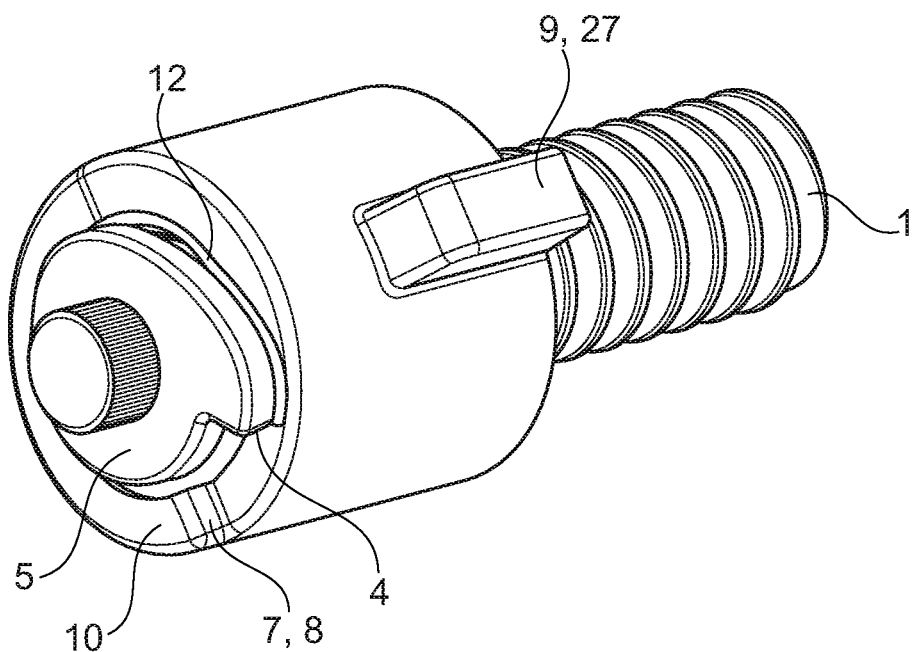
Figure 12:
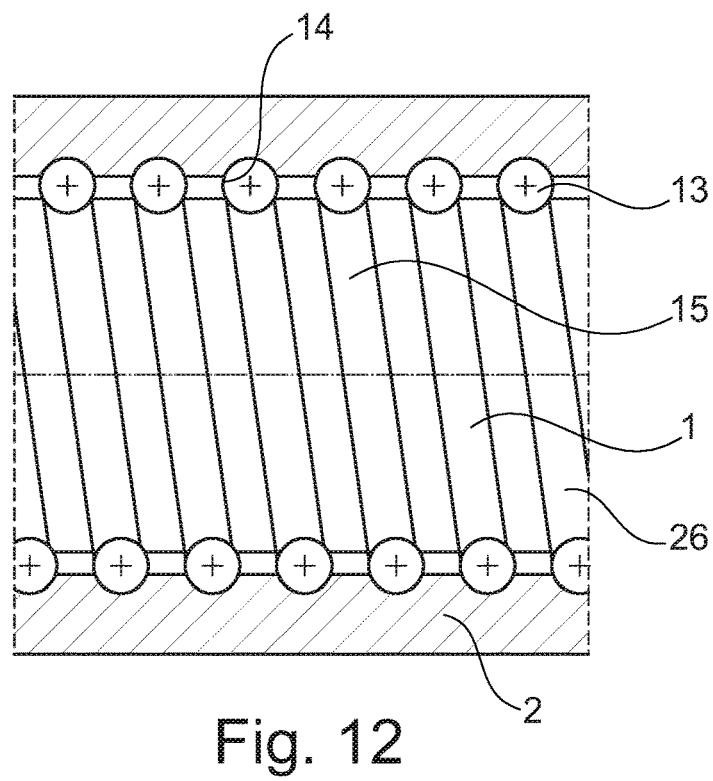
Figure 13:
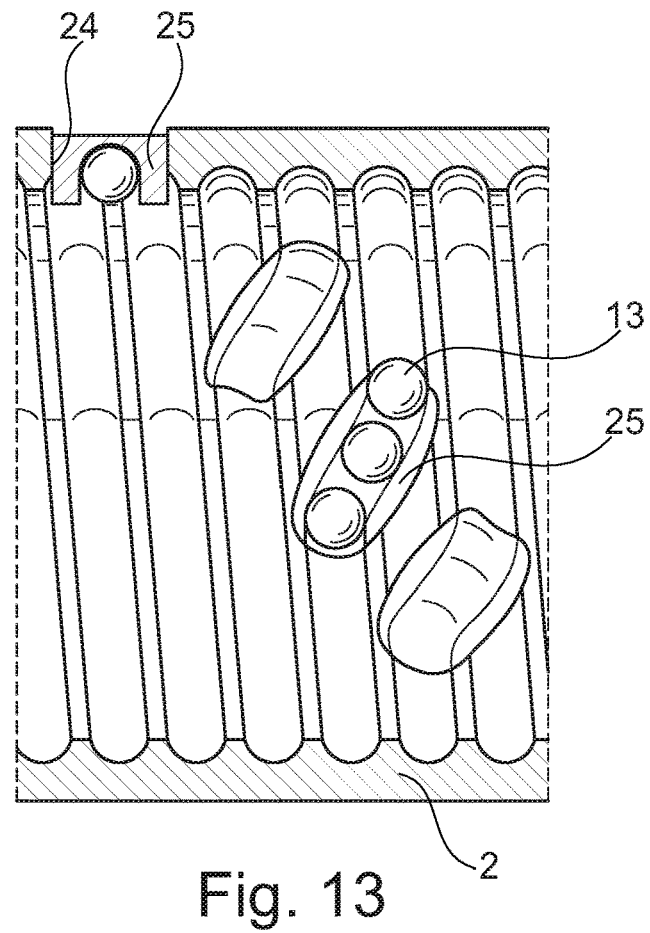

The ball screw shown in FIGS. 1 and 2 is provided with a spindle nut 2 arranged on a threaded spindle 1. The FIGS. 12 and 13 show longitudinal sections of the ball screw with this spindle nut 2. In a known way, balls 13 roll on ball grooves 14, 15 of the spindle nut 2, as well as the threaded spindle 1. FIG. 13 clearly shows the so-called individual deflectors. Deflection pieces 25 are arranged in multiple pass-through openings 24 arranged distributed around the circumference of the spindle nut 2. The balls 13 revolve in helical-shaped ball channels 26 wound about the spindle axis, wherein each deflection piece 25 connects a start and an end of a common winding of the ball channel 26 endlessly to each other.

The threaded spindle 1 is provided with a spindle-side circumferential stop 3 that has a stop surface 4 that is constructed integrally on a stop plate 5 arranged locked in rotation on the threaded spindle 1. The spindle nut 2 can have a cylindrical lateral surface.

FIGS. 1 and 2 show that a sleeve 6 is arranged on the spindle nut 2 that is pressed onto the spindle nut 2 in the embodiment. A mounting can be realized in a non-positive and/or positive-locking connection. In each case, the sleeve 6 can transmit torque between the sleeve 6 and the spindle nut 2. This sleeve 6 produced from thin-wall sheet metal in a shaping process is provided with an integrally formed nut-side circumferential stop 7 that has a stop surface 8.

The sleeve 6 is further provided with integrally formed bumps 9 that are arranged distributed over the circumference. These bumps 9 are used as anti-twist protection 27 of the spindle nut 2. The bumps can engage, for example, in grooves of a not shown component (housing, piston), so that the spindle nut 2 is locked in rotation relative to this component.

FIG. 1 shows a stop situation in which the circumferential stops 3, 7 contact each other. FIG. 2 shows a rotational position of the threaded spindle 1 and spindle nut 2 outside of the stop situation.

Figure 3:
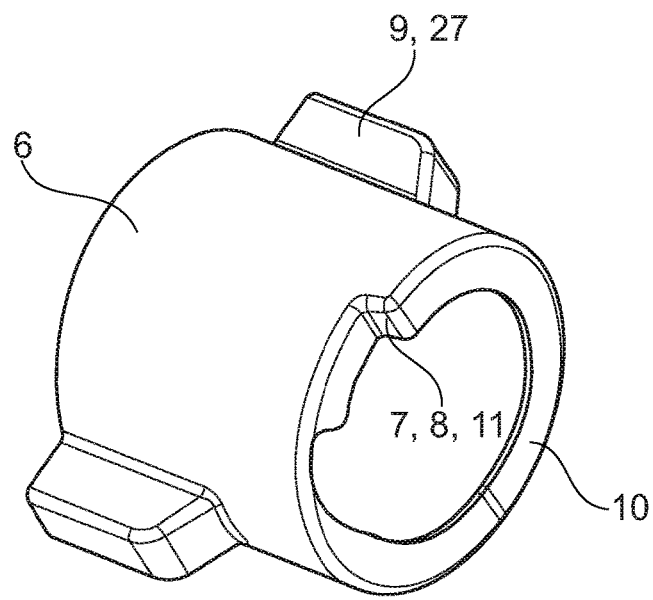
Figure 4:
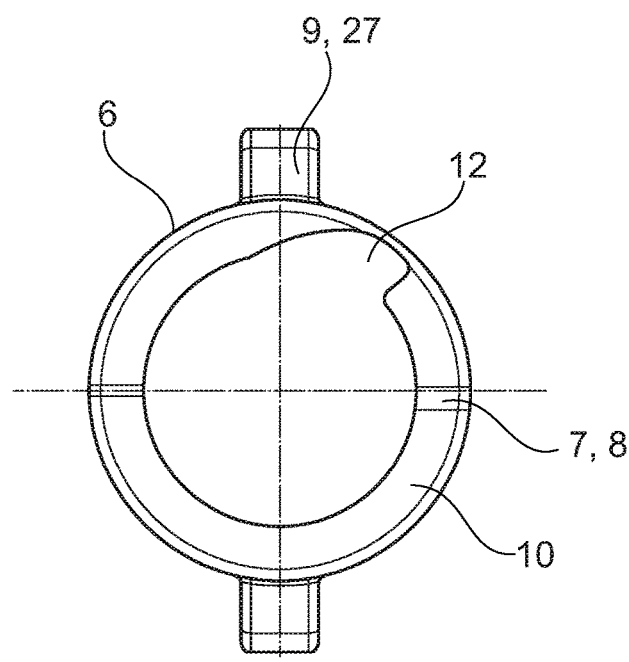
Figure 5:
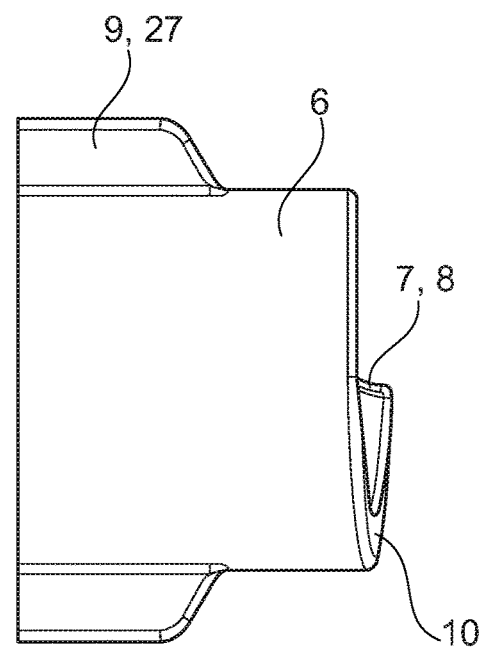

FIGS. 3 to 5 show the sleeve 6 as an individual part. This sleeve 6 is formed from sheet metal by shaping processes. The circumferential stop 7 is formed on an end-side radial flange 10 of the sleeve 6, wherein the radial flange 10 is provided with a step 11 formed in the axial direction on which the stop surface 8 of the nut-side circumferential stop 7 is formed. The step 11 is formed by an axial offset of the radial flange 10.

By shaping and bending processes of the sheet metal, the sleeve 6 can be produced in an economically favorable way.

FIG. 4 clearly shows a recess 12 on the radial flange 10. This radially inwardly open recess 12 is adapted to the contour of the stop plate 5 with its radially projecting, spindle-side circumferential stop. In this way, the sleeve 6 can be mounted, after which the threaded spindle 1 is mounted together with the spindle plate 5 and the spindle nut 2. The recess 12 and the circumferential stop 7 of the radial flange 10 are arranged circumferentially in their position spaced apart from each other such that the sleeve 6 is set on the spindle nut 2 and can be held or attached in a defined alignment position with reference to the stop plate 5. In this alignment position, the recess 12 and the stop plate 5 align with each other with the radially projecting stop surface 4, so that the sleeve 6 can be pushed over the stop plate 5. In this alignment position it is guaranteed that the spindle nut 2 provided with the sleeve 6 cannot jam with the stop plate 5. This is because the stop surfaces 4 and 8 contact each other before a jamming contact can occur.

FIG. 5 clearly shows that the radial flange 10 is arranged in a helical shape about the spindle axis of the threaded spindle. The helical shape can also be generated by a simple shaping process. The step 11 can be produced in an economically favorable way by bending and shaping processes of the thin-wall sheet metal.

Figure 6:
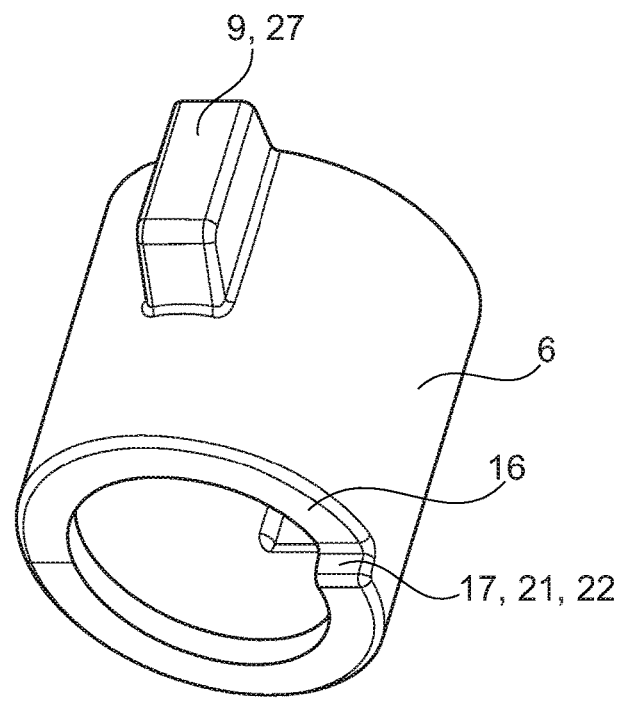
Figure 7:
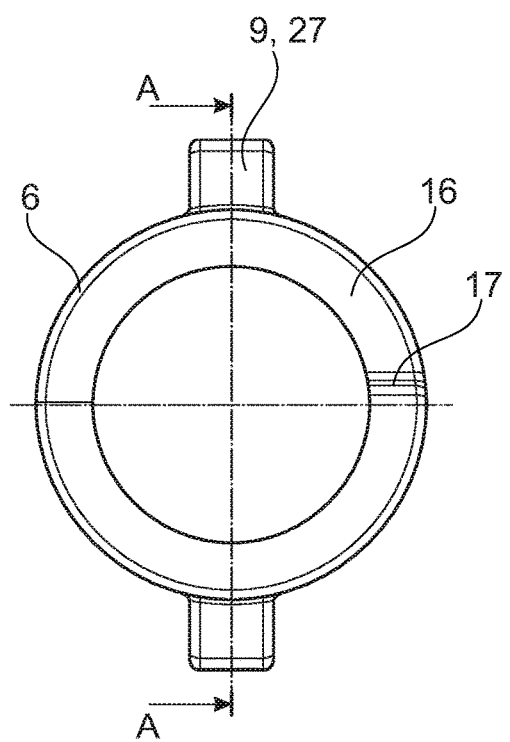
Figure 8:
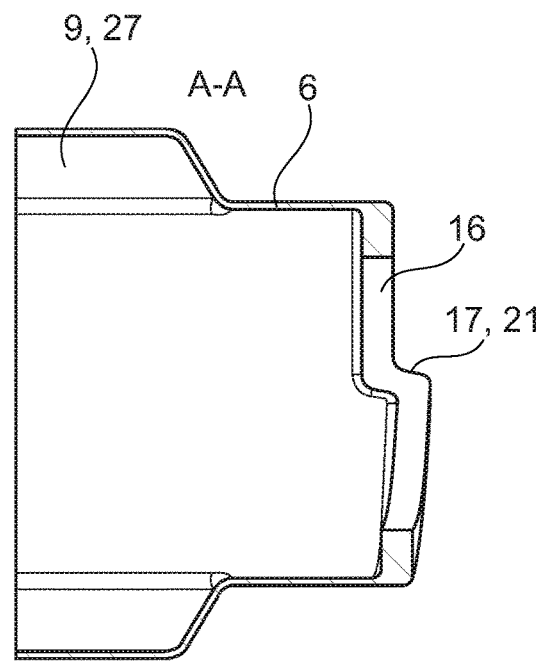

FIGS. 6 to 8 show one variant of the sleeve 8 of the ball screw according to the invention, which differs from the previously described sleeve 8 essentially by a modified radial flange 16. The radial flange 16 has a clearly increased wall thickness relative to the previously described radial flange. Just like in the previously described embodiment, a circumferential stop 17 is formed by an axial offset of the radial flange 16 in the form of a step 21. The increased wall thickness can be useful if the circumferential stop must absorb significantly increased circumferential forces. A stop surface 22 is formed on this step 21 for the spindle-side circumferential stop.

FIGS. 9 to 11 show another variant of the sleeve 8 that differs from the previously described embodiments in that, instead of a radial flange, an approximately crescent-shaped, radially inward directed projection 18 is formed on an end side of the sleeve 8. The projection 18 extends in the circumferential direction starting from a radially tapered end toward a radially expanded end. On the radially expanded end there is a circumferential stop 19 whose stop surface 23 corresponds to the wall thickness of the crescent-shaped projection 18. On its tapered end, the crescent-shaped projection 18 transitions at least approximately tangentially into the hollow-cylindrical lateral surface section of the sleeve 8.

This projection 18 can be formed, for example, by stamping of a thick-wall base of the sleeve 8. In this case, this projection 18 can have, in the axial direction, a wall thickness that is greater than the wall thickness of the sleeve 8. The wall thickness of the projection 18 determines, in this case, the size of the stop surface 23. This sleeve 8 can be produced in a favorable way in a shaping and stamping process: first the sleeve 8 is formed with a thick-wall base formed on the end side. In a stamping process, material can then be stamped out from this base, in order to form the mentioned crescent-shaped projection 18.

The invention claimed is:

1. A ball screw comprising:
   a spindle nut arranged on a threaded spindle,
   balls that roll on ball grooves of the spindle nut and the threaded spindle,
   a spindle-side circumferential stop, and
   a nut-side circumferential stop formed on a first axial end of a sleeve,
      the spindle nut is arranged in the sleeve that surrounds the spindle nut and is formed from sheet metal by shaping, and
      the nut-side circumferential stop and a rotational lock are formed integrally on the sleeve, and the rotational lock is formed on a second axial end of the sleeve opposite from the first axial end,
      the sleeve is provided with a radial flange with a recess for leading through the spindle-side circumferential stop,
      the recess and the nut-side circumferential stop have, in a circumferential direction, a predetermined distance to each other that is greater than zero, for determining a rotational position of the sleeve and the spindle nut in an aligned position of the spindle-side circumferential stop and the recess relative to each other.

2. The ball screw according to claim 1, wherein the rotational lock is formed by a hollow bump formed on the sleeve that projects radially from a cylindrical circumferential surface of the sleeve.

3. The ball screw according to claim 1, wherein the nut-side circumferential stop is formed on an end-side radial flange of the sleeve, and the end-side radial flange is provided with a step on which a stop surface of the nut-side circumferential stop is formed.

4. The ball screw according to claim 3, wherein the radial flange is arranged in a helical shape about a spindle axis of the threaded spindle, and the step is formed by an axial offset of the radial flange.

5. The ball screw according to claim 1, wherein the sleeve has, on one end side thereof, a radially inward directed crescent-shaped projection that extends in a circumferential direction from a radially tapered end to a radially expanded end, and a stop surface of the nut-side circumferential stop is formed on the radially expanded end.

6. The ball screw according to claim 1, wherein the balls are arranged in a screw-shaped ball channel wound about a spindle axis, a start and an end of the ball channel are connected to each other by a deflection body in an endless manner, and the sleeve surrounds the deflection body and is held captively on the spindle nut.

7. The ball screw according to claim 1, wherein the sleeve is connected to the spindle nut by at least one of a friction-fit connection or by a positive-locking connection for transmitting torques.

8. A method for installing the ball screw according to claim 1, comprising the following steps: mounting the spindle nut and the threaded spindle with the balls; setting up an aligned position of the sleeve and the spindle-side circumferential stop in which the recess and the spindle-side circumferential stop are aligned with each other; and in this aligned position, arranging the sleeve locked in rotation on the spindle nut.

9. A braking device of a motor vehicle with a ball screw according to claim 1.

* * * * *